United States Patent

Voight et al.

[15] 3,652,232
[45] Mar. 28, 1972

[54] METHOD FOR THE PURIFICATION OF HYDROUS ALUMINUM CHLORIDE

[72] Inventors: Richard W. Voight, Franklin, N.J.; David S. Hoffenberg, Bethlehem, Pa.

[73] Assignee: Pearsall Corporation, Phillipsburg, N.J.

[22] Filed: June 25, 1970

[21] Appl. No.: 56,059

Related U.S. Application Data

[63] Continuation of Ser. No. 717,021, Mar. 28, 1968, abandoned.

[52] U.S. Cl. .................................. 23/300, 23/305, 23/92
[51] Int. Cl. ................................... C01f 7/62, B01d 9/02
[58] Field of Search ............... 23/92, 143, 300, 295, 305, 23/312

[56] References Cited

UNITED STATES PATENTS

| 248,949 | 7/1881 | Newlands | 23/312 |
|---|---|---|---|
| 558,726 | 4/1896 | Gooch | 23/305 |
| 1,430,449 | 9/1922 | Howard | 23/305 |
| 1,403,061 | 1/1922 | Sieurin | 23/300 |
| 1,697,543 | 1/1929 | Seidler | 23/300 |
| 1,845,224 | 2/1932 | Blanc | 23/300 |
| 3,406,010 | 10/1968 | Holderred | 23/143 |

OTHER PUBLICATIONS

Mellor, Comp. Treatise on Inorg. and Theo. Chem., 1924, Vol. V., pages 314 to 318.

Primary Examiner—Norman Yudkoff
Assistant Examiner—S. J. Emery
Attorney—Howson & Howson

[57] ABSTRACT

In a method for the purification of hydrous aluminum chloride to remove iron, copper and other undesirable trace metals, and any organic contaminants present, hydrous aluminum chloride is precipitated from its aqueous solution by passing hydrogen chloride or a gas containing hydrogen chloride into the solution. The precipitate of hydrous aluminum chloride, which is separated from the aqueous solution by filtration is then washed, and either dried to produce pure aluminum chloride hexahydrate crystals, or redissolved to produce aqueous solutions of purified hydrous aluminum chloride of any desired strength. The iron, copper, and other undesirable trace metals and organic contaminants remain in the mother liquor.

1 Claim, No Drawings

METHOD FOR THE PURIFICATION OF HYDROUS ALUMINUM CHLORIDE

This application is a continuation of U.S. application, Ser. No. 717,021, filed Mar. 28, 1968, now abandoned.

BACKGROUND OF THE INVENTION

This invention relates to a process for the purification of hydrous aluminum chloride. More particularly, the invention relates to a process for the substantially complete removal of organic contaminants and iron, copper and other undesirable trace metals from spent hydrous aluminum chloride.

By spent hydrous aluminum chloride we mean aluminum chloride hexahydrate crystal or aqueous solution recovered from industrial operations such as the etching of roofing granules, or bleaching operations such as wool scouring, or generated from anhydrous aluminum chloride on quenching or drowning organic reactions in which this material has been used as a catalyst.

Hydrous aluminum chloride in both crystal and solution form has long been a valuable article of commerce, useful in such diverse applications as the manufacture of pharmaceuticals and roofing granules, and in papermaking and wool scouring for example.

More specifically, hydrous aluminum chloride is available commercially as 32° B. solution and as aluminum chloride hexahydrate crystals. The 32° B. solution contains about 27.5 percent aluminum chloride and the pure product is a colorless crystal clear liquid. Such a solution may be produced by dissolving anhydrous aluminum chloride crystals in water. The highest purity material previously commercially available, however, is prepared by reacting hydrochloric acid with high-purity hydrated alumina. A typical specification for such material is about 27.5 percent aluminum chloride and about 3 parts per million (p.p.m.) of iron. This material is available in polyethylene-lined drums, glass carboys, and in rubber-lined tank trucks. Production of the hydrous aluminum chloride solution has increased markedly in recent years to point where it now ranks with anhydrous aluminum chloride in total tonnage. This solution is widely used in the soap industry to salt out glycerin lyes, in the preparation of personal deodorants and antiseptics, as a wood preservative, in photographic fixing baths and in the manufacture of dry colors, aluminum hydroxide gel, roofing granules and pectin.

Aluminum chloride hexahydrate ($AlCl_3 \cdot 6H_2O$) which has a formula weight of 241.43, contains about 55.23 percent aluminum chloride, and is yellowish-white to colorless, deliquescent, granular crystal or powder material with an odor of hydrochloric acid. The uses of the crystals are similar to those of the aqueous solution described above, the solution being generally preferred for ease of handling. The crystals are available in polyethylene drums. A typical specification for this material is about 97.2 percent aluminum chloride hexahydrate, about 30 p.p.m. iron, and about 0.01 percent insoluble material. The foregoing information as to the characteristics of the hydrous aluminum chloride solution and crystals of commerce is derived from the Kirk-Othmer Encyclopedia of Chemical Technology, 2nd edition, volume 2, page 24, John Wiley and Sons, Inc., New York, N.Y., 1963.

In many of the commercial uses of hydrous aluminum chloride the purity of the material is of the utmost importance. Virgin hydrous aluminum chloride normally contains as the most undesirable impurity about 0.0001 to 0.001 percent of iron, and almost equally undesirable, like amounts of copper. The impurities in spent hydrous aluminum chloride are, of course, determined by its history and the application in which it was used. However, the vast majority of spent aluminum chloride contains as impurities increased amounts of iron, copper and other metals and organic impurities.

THE PRIOR ART

Numerous proposals have been made for removal of iron from either virgin or spent hydrous aluminum chloride. These proposals include treatment of hydrous aluminum chloride solution with the ferrocyanides, cyanides and sulfides of potassium and calcium; ammonium hydroxide and the hydroxides of aluminum, calcium, and manganese; the oxides of manganese, lead, tin and arsenic, and dust forms of aluminum, zinc and iron. All of these procedures are designed to percipitate iron salts, such as the ferricyanides, cyanides, sulfides and hydroxides. Such precipitates are generally extremely difficult to filter and these methods are only effective in uneconomically dilute solutions. Moreover, inasmuch as aluminum compounds coprecipitate with the iron compounds in these methods, the aluminum recovery efficiency drops sharply when it is attempted to increase the purity of the product. Moreover, such procedures are effective only for partial removal of iron and are useless for the removal of other common impurities. Indeed, most of these methods actually contribute additional impurities to the hydrous aluminum chloride solution treated.

The use of both solid and liquid phase ion exchange materials has been described in the literature for the removal of iron from aluminum chloride solution. These methods are also inefficient due to the affinity of aluminum, as well as iron, for the ion exchange materials. For this reason large quantities of aluminum are removed along with the minor amounts of iron in the solution, thus requiring frequent regeneration of the ion exchange material and, generally, uneconomic operation. Yet another proposal for the removal of iron from solutions of aluminum salts has been to add either a liquid ion exchange material or a chelating agent to the solution and then extract the complexed iron ions by means of an organic solvent. This proposal has the same disadvantages as the other procedures; namely the relative lack of selectivity of the reagents for iron over aluminum. This method also has the disadvantage of contaminating the aluminum salt solution with organic materials.

The removal of organic impurities from those aqueous solutions of hydrous aluminum chloride which contain them has also frustrated those skilled in the art prior to the present invention. Two principle methods have been employed heretofore. One involves a stripping or sparging operation in which steam or an inert gas is passed through the solution. A similar result may be achieved by boiling the solution for a specified length of time and then reconstituting the solution by the addition of water. The effectiveness of this procedure is limited, however, since only relatively insoluble or relatively low boiling organic impurities are removed. For example, such a method would be ineffectual in freeing hydrous aluminum chloride solution of ethylene glycol or ethylene chlorohydrin, if the solution contained these impurities, as some do. Activated charcoal treatment is also capable of removing as much as 80–90 percent of certain organic impurities which occur in spent hydrous aluminum chloride, but is ineffective for the removal of other common contaminants such as glycols.

In all prior processes removal of ionic impurities has been treated separately from removal of organic impurities and all general purification procedures have been two step processes.

A primary object of the present invention is to provide a process for the purification of hydrous aluminum chloride by the removal of both ionic (inorganic) and organic impurities, if any, in a simple and economical manner. Another object of the invention is to provide a process for the purification of spent hydrous aluminum chloride which is capable of removing virtually all deleterious organic and inorganic impurities simultaneously.

BRIEF SUMMARY OF THE INVENTION

We have discovered that the above and other objects of the invention can be accomplished by precipitating hydrous aluminum chloride from its aqueous solution by passing a stream of hydrogen chloride gas into the solution, recovering and washing the precipitate, and thereafter, either drying the purified crystals or dissolving them in water to provide aluminum chloride solutions of any desired concentration. Whereas virtually all of the prior art procedures have attempted to remove impurities, essentially one at a time, from solutions of hydrous aluminum chloride, our radically different process is based upon the surprising discovery that it is possible to remove the aluminum chloride from the solution and leave the impurities behind in the mother liquor.

The purification process of the present invention can be practiced either batchwise or continuously and, as indicated above, is essentially independent of the source of the aluminum chloride or its prior history. Moreover the new process can be employed to purify aluminum chloride virtually without regard to the concentration of aluminum chloride in the solution treated.

The purification of hydrous aluminum chloride, according to the process of the present invention, by precipitation from its impure aqueous solutions is effectively accomplished by using either wet or dry hydrogen chloride gas, or even dilute gas mixtures containing hydrogen chloride and inert gases such as nitrogen and air, for example. A particularly attractive and economical source of hydrogen chloride gas for use in the process of the present invention is a byproduct stream obtained during the substitutive chlorination of hydrocarbon materials.

The following specific examples of the process of the present invention are illustrative only, and are not to be construed as limiting the scope of the invention.

EXAMPLE I

A sample of commercial "technical" grade 27.5 percent (32° B.) hydrous aluminum chloride was analyzed and found to contain 0.0004 percent iron (as ferric ion). Dry hydrogen chloride from a cylinder of the compressed gas was sparged into 1,000 grams of the aluminum chloride solution at the rate of 300 grams per hour. The solution became quite warm as a pure white precipitate began to form. After about 1.5 hours the rate of hydrogen chloride absorption became very low as indicated by the fact that the solution had returned to room temperature and the increase in weight of the solution had leveled out. The percipitated aluminum chloride hexahydrate was collected on a funnel and washed with several small portions of 36 percent hydrochloric acid. After drying in a vacuum oven overnight, the yield of dry product was 495 grams (99.3 percent of theory). Analysis of this product for iron failed to indicate any detectable iron in the product. The analytical technique, which is known to those skilled in the art as the thiocyanate method, is believed to be capable of detecting the presence of iron at concentrations considerably less than 0.00001 percent, and is described in Standard Methods of Chemical Analysis, N. H. Furman, editor, vol. 1, 6th edition, page 552, Van Nostrand Co., 1963. The mother liquor weighed 775 grams and contained 35 percent hydrochloric acid. Analysis for iron showed the mother liquor to contain about 0.0005 percent, essentially all of the iron which had been initially present in the commercial hydrous aluminum chloride solution. The solution also was found to contain only about 0.35 percent $AlCl_3$.

EXAMPLE II

A sample of spent aluminum chloride solution, obtained from a process in which anhydrous aluminum chloride had been used in the manufacture of anthraquinone dyes, was analyzed. The solution was bright yellow in color, contained about 30.0 percent $AlCl_3$ and was contaminated with about 0.0330 percent of iron and about 0.004 percent of copper. Hydrogen chloride gas was sparged through a 1,000 gram sample of this material in a manner similar to that described in Example I. After 1 hour during which 300 grams of hydrogen chloride gas had been added, the reaction mixture was allowed to cool to room temperature. The precipitated aluminum chloride hexahydrate was collected on a funnel and washed with several small portions of 36 percent hydrochloric acid. The resulting pure white product was dried in a vacuum oven at 60° C.

The yield was 525 grams (98.9 percent of theory) of a free flowing material that assayed 102 percent aluminum chloride hexahydrate. Neither iron nor copper was detectable in the product. The test for copper was made by conventional procedures on an atomic absorption spectrophotometer. Further, the impurity (presumably organic) which was responsible for the bright yellow color of the original solution had also been removed. As in Example I, virtually all of the iron and copper originally present in the spent aluminum chloride solution was accounted for in the acidic mother liquor.

EXAMPLE III

A sample of spent aluminum chloride solution, obtained from a process in which anhydrous aluminum chloride had been employed to condense benzene with ethylene oxide, was analyzed. This solution was bright yellow in color and contained about 0.0420 percent iron, about 0.0018 percent copper and about 29.6 percent $AlCl_3$. The solution had an absorbance of 3.95 arbitrary units at 240 mu in the ultraviolet and 2.31 arbitrary units at 420 mu in the visible range. As in the previous example, 1,000 grams of this solution was treated with 300 grams of hydrogen chloride gas during a period of 1 hour. The precipitate was similarly collected on a funnel and washed with concentrated hydrochloric acid. In this case, however, instead of drying the crystals, they were transferred to a flask and dissolved in sufficient deionized water to make 1,000 grams of solution. Analysis of the resulting clear colorless solution showed it to contain about 29.3 percent (99 percent of theory) $AlCl_3$. Tests for iron and copper were negative. Absorbance in the ultraviolet region showed the peak at 240 mu to be 0.19 arbitrary units indicating a 95.4 percent removal of the impurity responsible for that peak. The absorbance at 420 mu was 0.048 units indicating about 97.6 percent removal of the impurity responsible for that peak.

EXAMPLE IV

A sample of spent aluminum chloride solution obtained from a process in which anhydrous aluminum chloride had been used in the synthesis of dodecylbenzene was obtained. This solution was a dull yellow-brown in color and contained about 30.0 percent $AlCl_3$, about 0.0175 percent iron and about 0.0072 percent copper. Spectroscopic analysis showed the presence of a compound absorbing at 240 mu to the extent of 11.3 arbitrary units and another at 420 mu to the extent of 2.45 arbitrary units. Precipitating the aluminum chloride hexahydrate contained in 1,000 grams of this solution, and proceeding as in Example III there was obtained a 99.1 percent recovery of the aluminum chloride, essentially free of iron and copper, and from which 91.3 percent of the material absorbing at 240 mu and 100 percent of the material absorbing at 420 mu had been removed.

EXAMPLE V

A sample of spent aluminum chloride solution was obtained from a process in which anhydrous aluminum chloride had been used in the polymerization of terpenes to low molecular weight hydrocarbon resins. This was a rather dilute solution containing only about 6.4 percent $AlCl_3$, about 0.0030 percent iron and about 0.0008 percent copper. Spectroscopic examination showed materials absorbing at 240 mu, 222 mu and 320 mu with absorbences of 2.39, 7.34 and 0.051 arbitrary units respectively. Into a 1,000 grams of this solution was passed 500 grams of hydrogen chloride gas during a period of 100 minutes. The resulting pure white precipitate was collected on a funnel, washed with 36 percent hydrochloric acid and dried to yield 110 grams (94.5 percent of theory) of aluminum chloride hexahydrate essentially free of iron and copper. The crystals were dissolved in water to make a 27.5 percent solution and the spectroscopic analysis rerun. The impurity absorbing at 240 mu had been removed to the extent of 97 percent, the impurity absorbing at 222 mu had been 90 percent removed, and the impurity absorbing at 320 mu had been completely removed.

EXAMPLE VI

This example illustrates the use of byproduct hydrogen chloride in the purification of hydrous aluminum chloride. A 4-liter resin flask was charged with 1,500 grams of a C-15 normal paraffin and about 0.1 percent benzoyl peroxide was added. While heating to 65° C., with agitation, chlorine gas was sparged into the reaction mixture at the rate of 250 grams per hour. After an induction period of 50 minutes the reaction became self sustaining and byproduct hydrogen chloride was emitted at about 125 grams/hr. The exit line from the chlorination reactor was connected to a sparger immersed in 100 grams of commercial "technical" aluminum chloride solution containing about 0.0004 percent iron. Aluminum chloride hexahydrate soon began to precipitate. After 1 hour, the precipitate was collected on a funnel and dried in the vacuum oven at 60° C. overnight. As in Example I, a 99 percent yield of aluminum chloride hexahydrate was obtained and the product was essentially free of iron.

EXAMPLE VII

This example describes the fairly large scale semicontinuous purification of spent aluminum chloride. The aluminum chloride solution was derived from a commercial process in which anhydrous aluminum chloride had been used as catalyst to condense ethylene and benzene to form ethylbenzene. The solution was pale yellow in color and contained about 24.7 percent $AlCl_3$, about 000530 percent iron and about 0.0037 percent copper. The solution also had a very strong benzene odor. A pilot plant for the chlorination of waxes and paraffins in which hydrogen chloride is a byproduct was started up. Ordinarily when in operation this pilot plant delivers the byproduct HCl to an absorption tower where it is dissolved in water and emerges as 36 percent hydrochloric acid. When the pilot plant was producing 30 pounds per hour of HCl gas steadily, the water in the absorption tower was replaced by the spent aluminum chloride solution, which was pumped into the tower at the rate of 100 lbs. per hour. The resulting aluminum chloride hexahydrate precipitate was washed downwardly in the tower by the liquid phase and collected in a rubber-lined centrifuge. After an hour's operation, the tower was switched back onto water and concentrated hydrochloric acid was produced for 15 minutes. This acid was used to wash the cake and then the tower was switched back to spent aluminum chloride solution while the centrifuge was emptied. The moist cake was dissolved in water and a small amount of alumina hydrate was added to adjust the pH to 0.8.

During 3 cycles a 98.7 percent recovery of the available aluminum chloride as a 27.5 percent solution was realized. The purified solution was clear and colorless, contained no detectable amounts of iron or copper and was free of undesirable odors.

The foregoing illustrates the practice of this invention which, however, is not to be limited thereby but is to be construed as broadly as permissible in view of the prior art and limited solely by the appended claims.

What is claimed is:

1. A process for separating aluminum chloride from organic contaminants and at least one other contaminant selected from the group consisting of iron, copper and other metals having soluble chlorides, which comprises introducing hydrogen chloride gas into an aqueous solution containing about 6 to 30 percent by weight of aluminum chloride containing said contaminants to percipitate crystalline hydrous aluminum chloride, separating the precipitated hydrous aluminum chloride, washing said hydrous aluminum chloride with hydrochloric acid, and drying the washed crystals to obtain in substantially quantitative yield, substantially pure hydrous aluminum chloride free of said contaminants, whereby the residual iron content is reducible to less than 0.00001 percent.

* * * * *